July 7, 1953   J. E. BECKER   2,644,304
FLUID CIRCULATION CONTROL FOR FLUID COUPLINGS
Filed July 17, 1952
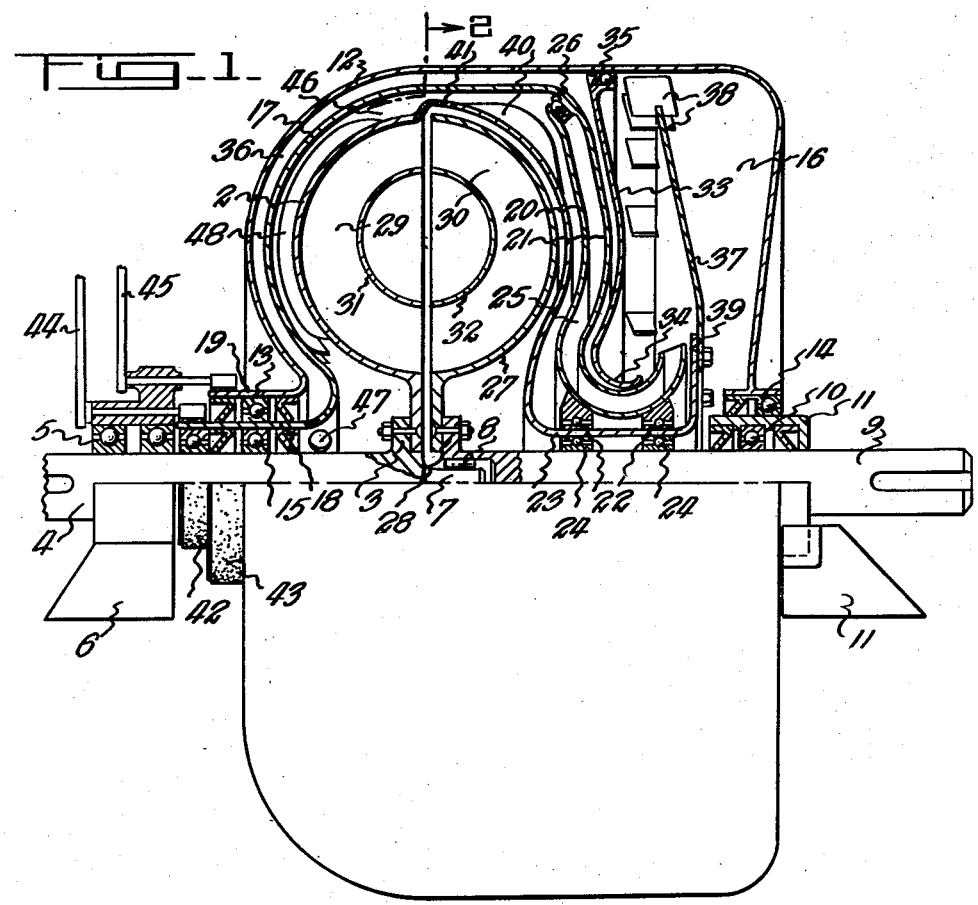
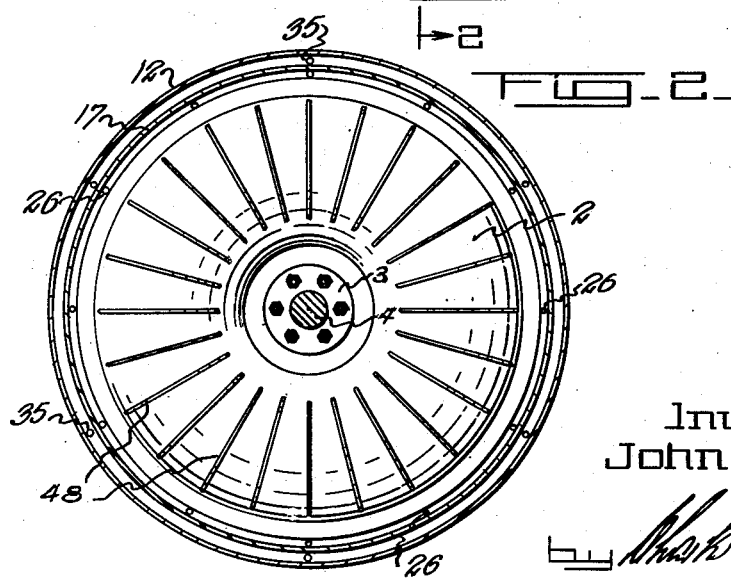
Inventor
John E. Becker Patented July 7, 1953

2,644,304

UNITED STATES PATENT OFFICE 2,644,304

FLUID CIRCULATION CONTROL FOR FLUID COUPLINGS

John Edward Becker, Darlington Township, Durham County, Ontario, Canada

Application July 17, 1952, Serial No. 299,459

8 Claims. (Cl. 60—54)

My invention relates to fluid circulation controls for fluid couplings of the type disclosed in my co-pending patent application Serial No. 294,108, filed June 17, 1952, and wherein is shown a fluid reservoir rotating in conjunction with the fluid coupling; the fluid being injected into the coupling from the reservoir through the medium of a pump wheel contained within the reservoir and connected to and driven by the impeller assembly. In my copending application I also disclose the use of a swingable scoop pipe for removing fluid from the coupling and directing it into the reservoir.

The object of this application is to dispense with the swingable scoop pipe and to mount a plurality of radial fins upon the peripheral portion of the outer face of the impeller housing and which act as a centrifugal pump for removing fluid from the coupling and directing it through a check valve arrangement into the fluid reservoir; the impeller housing being contained within a pair of freely rotatable, braked controlled, inner and outer shells, the outer shell being rotatable in unison with the fluid reservoir.

With the foregoing and other objects in view as shall appear, my invention consists of a fluid circulation control for fluid couplings, constructed and arranged all as hereinafter more particularly described and illustrated in the accompanying drawing in which:

Fig. 1 is a side elevational view of the coupling and reservoir assembly, the upper portion thereof being shown in section.

Fig. 2 is a transverse cross-sectional view through the coupling, being taken through the line 2—2, Fig. 1, to show the arrangement of the impeller housing contained therein.

Like characters of reference indicate corresponding parts in the two views of the drawing.

An impeller housing 2 of orbicular form is secured to a flange 3 on the inner end of a driving shaft 4 which is carried by a ball race 5 mounted within a supporting bracket 6. The inner end of the driving shaft 4 has a reduced diameter portion 7 extending into a needle bearing 8 contained within the inner end of the driven shaft 9. The driven shaft is carried by a ball race and seal ring assembly 10 within a supporting hub bracket 11 which is in alignment with the supporting bracket 6.

The entire coupling and reservoir assembly is contained within a rotatable cylindrical shell 12 carried upon a pair of ball bearing and seal ring assemblies 13 and 14; the assembly 13 surrounding an inner ball bearing and seal ring assembly 15, as shall be further explained, and the assembly 14 mounted upon the supporting hub bracket 11. One end of the shell 12 constitutes the fluid reservoir 16, and the other end of the shell envelopes and is spaced apart from an inner shell 17 surrounding and spaced apart from the impeller housing 2. The bearing and seal ring assembly 15 surrounds and is supported by the driving shaft 4, and the shell 17 is formed with an out-turned sleeve 18 which rides upon the assembly 15. The bearing and seal ring assembly 13 is mounted between the out-turned sleeve 18 of the inner shell 17 and an out-turned sleeve 19 formed upon the outer shell 12.

The inner shell 17 follows the contour of the outer shell 12 at the driving shaft end of the coupling assembly, and intermediately of the length of the shell 12 is formed with a pair of spaced apart walls 20 and 21 which are belled at their inner peripheries to form a fluid entry to the fluid reservoir 16. The walls 20 and 21 are of dish shape to substantially follow the contour of the adjacent side of the impeller housing 2.

The curved inner periphery of the wall 20 is supported by a ball race assembly 22 mounted upon a sleeve 23 surrounding the driven shaft 9 and extending from the impeller housing 2 into the fluid reservoir 16. The sleeve 23 rides upon a ball race assembly 24 carried by the driven shaft 9. Fluid entry into the passage 25 between the walls 20 and 21 is controlled by several spaced apart ball check valves 26 arranged within the outer peripheral closure between the walls.

A concave ring shaped runner housing 27 is contained within the impeller housing 2 and has its central portion attached to a flange 28 on the inner end of the driven shaft 9. The impeller housing 2 and the runner housing 27 carry a plurality of the usual radial impeller and runner blades 29 and 30 which support the usual ring members 31 and 32, whereby passages for the fluid transmission of power are constituted.

The reservoir 16 is partitioned from the coupling by a dished ring wall 33 having its inner peripheral ring portion 34 curved to slidably rest against the curved inner peripheral face of the wall 21. The partition wall 33 contains a plurality of suitably spaced apart ball check valves 35 which provide one way passages from the reservoir to the space 36 between the shells 12 and 17. To inject fluid from the reservoir into the coupling, as shall be later described, a pump disc wheel 37 carrying peripheral blades 38 is secured to a flange 39 formed upon the reservoir end of the sleeve 23, whereby the pump wheel rotates in unison with the impeller housing 2.

In order to transfer fluid from the fluid coupling to the fluid reservoir, a plurality of radially arranged centrifugal pump vanes 40 are mounted upon the peripheral face of the impeller housing 2 adjacently to the check valves 26. The valves provide entry to the fluid passage space 25 between the walls 20 and 21 and which leads to the fluid reservoir.

Due to the assembly unit formed by the outer shell 12, inner shell 17 and fluid reservoir 16 being freely mounted upon the bearing assemblies 13, 14 and 15, the unit will normally rotate under the action of the rotative movement of the fluid in the coupling assembly. The fluid in the assembly is free to centrifugally flow from the peripheral portion of the impeller housing 2 to the interior of the shell 17 through peripheral orifices 41 in the housing, and as a certain quantity of the fluid is generally present in either the reservoir 16 or the space 36 between the shells 12 and 17, the outer shell 12 will also rotate with the unit.

To govern the rotative movement of the shells 12 and 17 any suitable braking mechanisms may be used, as for example, a pair of brake bands 42 and 43 surrounding the shell sleeves 18 and 19 and actuated under movement of the brake handles 44 and 45. The fluid passage space 36 between the shells communicates with the fluid passage space 46 between the shell 17 and the impeller housing 2 through a plurality of orifices 47 contained in the central portion of the shell 17 where it merges into its sleeve 18. The outer face of the impeller housing 2 carries a number of radial fins 48 which produce a rapid centrifugal movement of the fluid when passing outwardly from the orifices 47 to enter the impeller housing 2 through its peripheral orifices 41.

*Operation*

When the coupling is in driving operation, the shells 12 and 17 surrounding the coupling are rotating therewith, as is also the reservoir 16 and turbine wheel 37. Fluid is contained within the impeller housing 2 and also within the inner shell 17, the fluid in the housing 2 acting as the coupling medium between the impeller blades 29 and runner blades 30 and also being in the form of a centrifugal ring within the shell 17.

To remove all or part of the fluid from the coupling, the brake 42 is applied to retard the rotative movement of the shell 17. Immediately the speed of rotation of the shell 17 falls below the speed of rotation of the impeller housing 2 which carries the pump vanes 40, the rotation of the vanes will create a hydrostatic pressure in the fluid ring in the shell 17 with the resultant passage of the fluid through the check valves 26 into the passage space 25 between the dish shaped walls 20 and 21 and from thence into the fluid reservoir 16.

As the shell 12 and reservoir 16 rotate at substantially the same speed as the speed of the impeller housing, due to fluid friction, there is very little difference between the speed of rotation of the fluid reservoir 16 and the contained pump wheel 37 which rotates in unison with the impeller housing 2; consequently the reservoir 16, its contained centrifugal fluid ring and blades 38 of the pump wheel normally have substantially the same speed of rotation.

To pump fluid from the reservoir 16 to the coupling, the brake 43 of the outer shell 12 is applied, which will retard or stop rotation of the reservoir 16, while at the same time the pump wheel 37 which is connected to the impeller housing 2, maintains its speed. This action creates a hydrostatic pressure in the fluid ring in the reservoir, with the resultant passage of fluid through the check valves 35 into the space 36 between the shells 12 and 17 and from thence through the orifices 47 into the fluid passage space 46 between the impeller housing 2 and inner shell 17 to be forced through the orifices 41 into the coupling assembly.

From the foregoing description it will be apparent that any desired speed ratio from the full driving speed of the driven shaft down to a standstill and vice versa may be obtained through manipulation of the brakes governing the speed of rotation of the two shells, and while I have shown a particular arrangement of my invention it is to be understood that constructional variations may be made without departing from the underlying principle of the invention as set forth in the appended claims.

What I claim as my invention is:

1. In combination with a fluid coupling assembly comprising a driving shaft and an impeller housing coupled to the driving shaft, a runner housing contained within the impeller housing and coupled to a driven shaft, an outer fluid frictionally driven freely rotatable shell within which the coupling assembly is contained, a fluid reservoir coupled to the shell and rotatable therewith, a check valve controlled passage forming a fluid communication between the shell and the reservoir, and pump vanes mounted upon the impeller housing for pumping fluid through the passage, of a pump wheel contained within the fluid reservoir and rotatable in unison with the driving shaft to constitute a fluid pump within the reservoir, a check valve controlled pumped fluid passage extending from the reservoir to the coupling, and brake means controlling the rotative speed of the reservoir.

2. A combination as defined in claim 1, wherein an inner fluid frictionally driven freely rotatable shell is contained within the outer shell and spaced apart therefrom, the coupling assembly being contained within the inner shell, part of the passage from the reservoir to the coupling assembly being formed by the space between the two shells.

3. A combination as claimed in claim 1, wherein an inner fluid frictionally driven freely rotatable shell is contained within the outer shell and spaced away therefrom, the coupling assembly being contained within and spaced away from the inner shell, the passage from the reservoir to the coupling assembly being formed by the space between the two shells and the space between the inner shell and the impeller housing, the impeller housing containing a plurality of peripherally arranged fluid inlet orifices which lead from the space between the inner shell and the impeller housing to the interior of the impeller housing.

4. A fluid coupling assembly comprising a driving shaft and an impeller housing coupled to the driving shaft, a runner housing contained within the impeller housing and coupled to a driven shaft, a pair of spaced apart outer and inner fluid frictionally driven shells and within the inner shell of which the coupling assembly is contained in spaced apart relation thereto, a fluid reservoir coupled to the outer shell and rotatable therewith and communicating with the interior of the outer shell and the interior of the coupling through a check valve controlled fluid passage, a pump wheel contained within the fluid reservoir and rotatable in unison with the driving shaft to constitute a fluid pump within the reservoir, brake means for controlling the rotative speed of the two shells and the reservoir, a pair of spaced apart disc-shaped walls extending from the periphery of one end of the inner shell to the vicinity of its axis and opening into the central portion of the reservoir to form a fluid passage between the interior of the inner shell and the reservoir, and pump vanes mounted upon the outer face of the impeller housing for pumping fluid through the passage between the pair of inner shell disc walls under the action of the brake reduced speed of the inner shell in relation to the constant speed of the impeller housing.

5. A fluid coupling assembly as defined in claim 4, wherein the fluid passage from the reservoir to the interior of the coupling is formed by the space between the inner and outer shells and the space between the inner shell and the impeller housing, the impeller housing containing a plurality of fluid inlet orifices which lead from the space between the inner shell and the impeller housing to the interior of the impeller housing.

6. A fluid coupling assembly as defined in claim 4, wherein the fluid passage from the reservoir to the interior of the coupling is formed by the space between the inner and outer shells and the space between the inner shell and the impeller housing, the impeller housing containing a plurality of fluid inlet orifices which lead from the space between the inner shell and the impeller housing to the interior of the impeller housing, and a plurality of fluid centrifugal force creating fins carried upon the outer face of the impeller housing and projecting into the space between the impeller housing and the inner shell.

7. A fluid coupling assembly as defined in claim 4, wherein entrance to the space between the disc walls of the inner shell is controlled by a plurality of check valves positioned in spaced apart relation around the inner periphery of the inner shell and adjacent to the pump vanes on the impeller housing.

8. A fluid coupling assembly as defined in claim 4, wherein entrance to the space between the disc walls of the inner shell is controlled by a plurality of check valves positioned in spaced apart relation around the inner periphery of the inner shell and adjacent to the pump vanes on the impeller housing, and wherein the fluid passage from the reservoir to the interior of the coupling is formed by the space between the inner and outer shells and the space between the inner shell and the impeller housing, the impeller housing containing a plurality of fluid inlet orifices which lead from the space between the inner shell and the impeller housing to the interior of the impeller housing.

JOHN EDWARD BECKER.

References Cited in the file of this patent

UNITED STATES PATENTS

| Number | Name | Date |
|---|---|---|
| 2,187,656 | Kiep et al. | Jan. 16, 1940 |
| 2,550,664 | Becker | May 1, 1951 |